J. LUCAS.
APPARATUS FOR PREPARING LAKES AND COLORS.
No. 108,713. Patented Oct. 25, 1870.
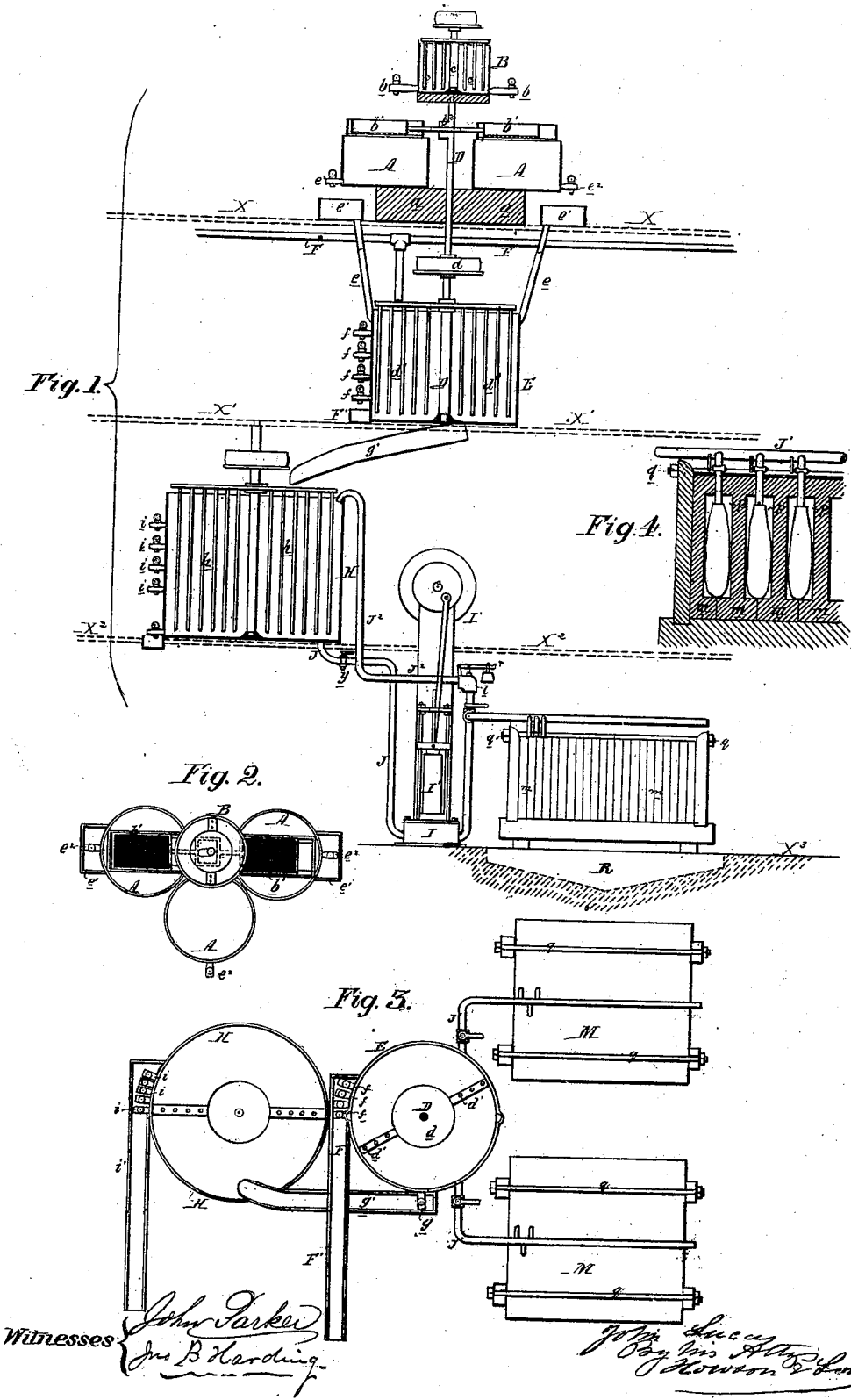

United States Patent Office.

JOHN LUCAS, OF PHILADELPHIA, PENNSYLVANIA.

Letters Patent No. 108,713, dated October 25, 1870.

IMPROVEMENT IN APPARATUS FOR PREPARING LAKES AND COLORS.

The Schedule referred to in these Letters Patent and making part of the same

I, JOHN LUCAS, of Philadelphia, county of Philadelphia, State of Pennsylvania, have invented certain Processes and Apparatus for Preparing Colors, of which the following is a specification.

Nature and Object of the Invention.

My invention consists of certain automatic apparatus, too fully described hereafter to need preliminary explanation, for the mixing, chemically treating, washing, concentrating, and compressing of colors.

Description of the Accompanying Drawing.

Figure 1 is a side elevation, partly in section, of my apparatus for preparing colors;

Figure 2, a plan view of the upper portion of the same;

Figure 3, a sectional plan on the line 1 2, fig. 1; and

Figure 4, a detached sectional view of part of the press.

General Description.

The dotted lines $x$, $x^1$, $x^2$, and $x^3$, are supposed to represent the several floors of a building within which the apparatus is arranged, or they may represent a series of platforms forming part of a suitable frame, constructed for the support of the apparatus.

Upon the upper floor $x$ is a raised platform, $a$, upon which are two, three, or more vessels, A, and above the latter is a mixing-box, B, provided with cocks $b$ at the bottom, so that it may discharge its contents into sieves $b^1$, arranged above the vessels A.

Within the box B is a vertical spindle, $c$, on which is a cross-piece with arms, forming a mixing or stirring device, $c'$, which may be similar to that used in brewers' mash-tubs.

A reciprocating motion can be imparted to the sieves $b^1$ above the vessels A by a crank, $b^2$, on a vertical shaft, D, which turns in a step at the bottom of a large vessel, E, on the floor $x^1$, and in a cross-piece which supports the vessel B.

This shaft is driven, in the present instance, by a pulley, $d$, and is provided within the vessel E, with a mixer, $d'$, similar to that of the upper vessel B.

The vessel E should be of sufficient capacity to receive the contents of all the vessels A, the said contents passing through cocks $e^2$ into receptacles $e^1$, and thence through pipes $e$.

A pipe, F, is provided with a suitable faucet, is arranged above and so that it may discharge water into the vessel E; and in one side of the latter is a row of cocks, $f$, arranged at different heights above an inclined trough, F'.

The vessel E has also, at a point beneath the lowest of the cocks $f$, another cock, $g$, fig. 2, through which the concentrated contents of the said vessel may be drawn off into a spout, $g'$, to be thence conducted into a larger vessel, H, on the lower floor $x^2$.

This latter vessel, which is of sufficient capacity to receive the contents of two or more vessels E, has within it a vertical spindle and mixer, $h$, and it has also a row of cocks, $i$, arranged at different heights above a spout, $i'$.

This vessel H is so arranged that its contents may be drawn off through a pipe, J, into a valve-chest, I, by the action of a pump, I', and forced by the latter through another pipe or pipes, J¹, into presses M, in which the color receives its final treatment.

A return pipe, J², in which is a safety-valve, $l$, is connected to the pipe or pipes J¹ and communicates with the upper portion of the vessel H.

The presses M are of the peculiar construction, best observed in fig. 4. Each consists of a number of loose blocks or plates, $m$, arranged side by side within a suitable frame, and cut away or recessed on both sides, so as to form a series of spaces or chambers, $p$, each of which contains a bag or cloth folded to the shape of the bag, and having a nozzle which projects upward between the blocks of the press, in order that it may be connected to one of the branches of the pipe J¹, the latter having as many branches as there are bags and spaces between the blocks, each branch being provided with a suitable cock.

The several plates forming the press are drawn tightly together before the apparatus is put in operation by screw-rods $q$.

Operation.

The vessels A having been partially filled with the different chemicals used in the manufacture of the color which it is desired to produce, the material which is to form the body of the color is introduced into the box B above the said vessels, and is then thoroughly mixed with water.

After this the cocks $b$ are then opened, either one at a time or simultaneously, and the mixture is permitted to flow onto the reciprocating sieves $b^1$, which serve as strainers, and prevent the admission into the vessels A of any non-pulverized particles.

Within the vessels A the material is mixed with the different chemicals with which it is to be treated, and is thence, together with the chemicals, discharged into the receptacles $e^1$, whence it flows through the pipes $e$ into the vessels E beneath.

The receptacles $e^1$ are not in all cases necessary, but are used principally to receive the contents of two or more vessels A, thus enabling said contents to be conducted by a single pipe, e, into the vessel E.

The color is formed by the mixture within the vessel E, by the admixture therein of the different chemicals and materials from the vessels A, the several substances being thoroughly mixed together by the action of the stirrer d', and being in some cases treated at the same time with water from the pipe F, and the result of the chemical action which ensues being the formation of the desired color as a precipitate in the vessel.

In order that this operation may be fully understood, we will suppose that the color known as chrome-green has to be made in the apparatus. A quantity of salts of lead is introduced into the box B, and there mixed with water, while in one of the vessels A is placed bichromate of potash, in another blue, and in a third base, and so on with the various ingredients that are to be used.

The salts of lead from the box B is mixed with the different chemicals in the vessels A, as described above in general terms, and the contents of the several vessels are discharged into the vessel E, and are there thoroughly mixed together, a chemical action then taking place, and resulting in the formation of chrome-green, which, in the form of a precipitate, settles to the bottom of the vessel.

It is necessary, in the first place, to thoroughly wash this precipitated color with water, and to afterward concentrate it or deprive it of as much of this water as possible previous to conducting it to the presses M, to be there formed into cakes.

This washing is accomplished in the vessel E, which, after the chemical mixture has been drawn off from above the precipitated color, is filled or nearly filled with water out of the pipe F.

The water and color are thoroughly mixed together by the stirring device d', after which the mixture is allowed to settle, and the acidulated water is drawn off by the uppermost of the cocks f, and discharged into the trough F', by which it is carried off as waste, care being taken, however, that no color is discharged with the water.

After drawing off most of the water the color is again washed by filling up the vessel E a second time, revolving the mixer d', and then again drawing off the water through the cocks f, this operation being repeated until pure water is discharged.

From the vessel E the color thus washed is conveyed into the larger vessel H, which, as before mentioned, is intended to receive the contents of several vessels E, in order that quantities of color made at about the same time in adjacent apparatus may be thoroughly mixed together, and thus a product of uniform shade be obtained.

The treatment of the color within the vessel H is somewhat similar to its treatment in the smaller vessels E, it being thoroughly mixed together by the stirrer h, and being then allowed to settle, in order that the superfluous water may be discharged through the cocks i prior to the drawing off of the color by the pump I'.

The color, which, when concentrated as above described, is a pasty, semi-fluid mass, is drawn by the pump, through the pipe J, into the valve-box I, and is then forced through the pipe $J^1$ into one of the presses M', the cock on the pipe leading to the other press or presses being turned off.

The color is forced through the branches of the pipe $J^1$ into the bags or cloths contained in the chambers between the plates of the press, and the required pressure for forcing the water from the color contained in the said bags or cloths is exerted by the pump through the pipe $J^1$, the water being expelled through the interstices of the cloths or bags, and dropping through openings in the bottom of the press into a receptacle, K, beneath.

This receptacle communicates by suitable pipes with the pump and vessel H, so that, in case of the bursting of any of the bags, and discharge of color into the said receptacle, it can be readily conducted back into the vessel H to be again pressed.

The bursting of the bags or cloths can, however, very seldom occur, as by the employment of the safety-valve l on the return pipe $J^2$ the pressure on the bags can never exceed a predetermined limit.

As the safety-valve lever will be raised as soon as the bags are filled, and the water expressed from the color contained in the same, it serves as an indicator to the attendant, who immediately cuts off the supply of color to the first press, and opens the cock in the pipe leading to the second, in order that the latter may be filled, and the operation conducted uninterruptedly.

While the bags of the second press are being filled the screw-rods of the first press are loosened, and the several plates detached from each other, in order to permit the removal of the bags, the latter being opened, and the color pressed into cakes of a uniform size, removed to any suitable drying oven.

The press is then put together again, so as to be ready to receive another charge by the time the second press is filled, the operation being thus conducted continuously for as long a time as may be necessary.

Among the advantages of my invention may be mentioned the following:

The operations of mixing the crude material, of the chemical treatment of the same, and discharge into the mixing and washing-vessel being performed automatically instead of by hand, as usual, will be very regularly performed, and, consequently, the product will be much more uniform in quality and shade than it has been heretofore possible to obtain it.

The principle of discharging from a number of small into larger vessels, and from the latter into a single mixing-vessel of great capacity before the final operation of pressing insures a thorough mixing of the several products, and, consequently a color of uniform shade, to be finally obtained from the aggregation of the contents of all of the vessels.

The press is also peculiarly adapted for the treatment of colors, as any accident to one of the bags or to one portion of the press need not interfere with the operation of the other bags or portion of the press, all that is necessary in case of such accident being to turn off the cocks in the branches leading to the injured parts, and to continue the operation of the remaining parts of the press or presses.

Claims.

1. The mixer B, any desired number of vessels A, and a mixing-vessel, E, with their cocks and pipes, the whole arranged substantially as described.

2. The combination of the mixer B, vessels A, and reciprocating sieves $b^1$.

3. The vertical shaft D, in combination with the vessel E and sieves $b^1$.

4. The combination of the receivers $e^1$ with the vessels A and E.

5. The vessel E with its mixer or agitator, and series of cocks f and spout F'.

6. The combination of the vessel E, spout g', and vessel H.

7. The combination of the mixing-vessel H, any desired number of vessels E, and any appropriate number of vessels A with pipes and spouts, arranged substantially as described.

8. The combination, with the vessel H and its agitator, of the pump herein described, or any equivalent pump, and the within-described press or presses and system of pipes, all arranged substantially as described.

9. The safety-valve $l$ in the pipe leading from the force-pipe to the vessel H.

In testimony whereof I have signed my name to this specification in the presence of two subscribing witnesses.

JOHN LUCAS.

Witnesses:
WILLIAM WATERALL,
H. C. ELLIOTT.